United States Patent
Zhang et al.

(10) Patent No.: US 8,493,833 B1
(45) Date of Patent: Jul. 23, 2013

(54) SLEW RATE-VARIATION BASED DRIVER EQUALIZATION FOR FAR-END CROSSTALK CANCELLATION

(75) Inventors: Liang L. Zhang, Duluth, GA (US); Suresh Atluri, Duluth, GA (US)

(73) Assignee: Integrated Device Technology, Inc., San Jose, CA (US)

(*) Notice: Subject to any disclaimer, the term of this patent is extended or adjusted under 35 U.S.C. 154(b) by 370 days.

(21) Appl. No.: 12/885,049

(22) Filed: Sep. 17, 2010

(51) Int. Cl.
  *H04J 3/10* (2006.01)

(52) U.S. Cl.
  USPC .......................................... 370/201

(58) Field of Classification Search
  USPC .................... 370/201; 327/100, 170
  See application file for complete search history.

(56) References Cited

U.S. PATENT DOCUMENTS

| | | | | |
|---|---|---|---|---|
| 5,758,188 A * | 5/1998 | Appelbaum et al. | | 710/35 |
| 6,005,890 A * | 12/1999 | Clow et al. | | 375/221 |
| 6,069,511 A * | 5/2000 | Mohan | | 327/171 |
| 6,157,204 A * | 12/2000 | Sher et al. | | 326/21 |
| 6,175,883 B1 * | 1/2001 | Kvamme et al. | | 710/22 |
| 6,205,220 B1 | 3/2001 | Jacobsen et al. | | |
| 6,429,708 B2 * | 8/2002 | Asano et al. | | 327/170 |
| 6,983,436 B2 * | 1/2006 | Amekawa | | 716/115 |
| 7,126,394 B2 * | 10/2006 | Hargan | | 327/170 |
| 7,248,088 B2 * | 7/2007 | Hargan | | 327/170 |
| 7,394,752 B2 | 7/2008 | Hasegawa et al. | | |
| 7,478,287 B2 * | 1/2009 | Funaba et al. | | 714/700 |
| 7,521,968 B2 * | 4/2009 | Dreps et al. | | 326/86 |
| 7,593,458 B2 | 9/2009 | Cioffi | | |
| 7,692,463 B2 * | 4/2010 | Hargan | | 327/170 |
| 7,962,463 B2 * | 6/2011 | Cava | | 707/706 |
| 8,115,509 B2 * | 2/2012 | Takada | | 326/27 |
| 2005/0180410 A1 * | 8/2005 | Pepenella | | 370/386 |
| 2011/0069782 A1 * | 3/2011 | Wilson et al. | | 375/295 |

OTHER PUBLICATIONS

A. Mallahzadeh, A. Ghasemi, S. Akhlaghi, B. Rahmati, and R. Bayderkhani, "Crosstalk Reduction Using Step Shaped Transmission Line," Progress in Electromagnetics Research C, vol. 12, pp. 139-148, 2010.
T. Gazizov, "Far-End Crosstalk Reduction in Double-Layered Dielectric Interconnects," IEEE Transactions on Electromagnetic Compatibility, vol. 43, No. 4, pp. 566-572, Nov. 2001.
Y. Chien and H. Tsao, "A Novel Transmitter-Side-Based Far-End Crosstalk Cancellation for 10GBASE-T," Communication Technology, ICCT, pp. 1-4, Nov. 2006.
J. Buckwalter and A. Hajimiri, "Cancellation of Crosstalk-Induced Jitter," IEEE Journal of Solid-State Circuits, vol. 41, No. 3, pp. 621-632, Mar. 2006.

* cited by examiner

*Primary Examiner* — Chi Pham
*Assistant Examiner* — Robert Lopata
(74) *Attorney, Agent, or Firm* — Sawyer Law Group, P.C.

(57) ABSTRACT

A communication system is disclosed. The communication system comprises a printed circuit board. The printed circuit board includes a plurality of channels; The communication system includes a plurality of receivers coupled to outputs of the plurality of channels; and a plurality of drivers coupled to inputs of the plurality of channels, wherein a slew rate for each of the plurality drivers is dependent on the transitions of its neighboring drivers. The communication system further includes a plurality of slew rate equalizers coupled to the plurality of drivers, wherein a slew rate driver coupled to a victim channel compensates for cross talk from its neighboring aggressor channels by adjusting its slew rate based upon a signal received from the slew rate equalizer of the victim channel.

17 Claims, 5 Drawing Sheets

SLEW RATE-VARIATION BASED DRIVER EQUALIZATION FOR FAR-END CROSSTALK CANCELLATION

FIELD OF THE INVENTION

The present invention relates generally to a communication platform and more particularly to a method and system for minimizing cross-talk in such a platform.

BACKGROUND OF THE INVENTION

There are many challenges in broadband communications links. In particular, in a communication environment where it is desired to have high aggregate throughput such as at multigigabit speeds, special consideration is required to meet future data rates. At high frequencies, serial links are susceptible to electromagnetic interference as well as strong attenuation and reflections caused by poor electrical interfaces.

Printed circuit boards (PCB) such as FR4 boards are particularly limited at higher frequencies. These boards suffer from attenuation due to skin losses, via stubs, and connectors, severely limiting the signal integrity. To combat high-frequency attenuation, amplitude equalization is introduced in the transmitter (pre-emphasis) or receiver (post-emphasis). Equalizer implementation is straightforward at the receiver, but high-frequency attenuation requires amplification of the signal and, therefore, the noise, limiting the signal-to-noise ratio (SNR).

Pre-emphasis compensates for high-frequency attenuation prior to the addition of noise over the interconnect. This approach, however, suffers drawbacks in environments where several serial links are situated in close proximity such as on PCBs. In backplanes as well as integrated circuit environments, a premium on space precludes creating completely shielded links. Therefore, as faster data rates are achieved, high-frequency signal components couple more electromagnetic energy into neighboring channels. This coupling manifests as near-end crosstalk (NEXT) and far-end crosstalk (FEXT).

Crosstalk results from the interaction of electromagnetic fields generated by neighboring data signals as they propagate through transmission lines and connectors. For instance, either inductances or capacitances can dominate interconnect crosstalk on PCBs and backplane connectors introduce multi-pin crosstalk. Crosstalk considerations also affect the performance of integrated digital circuits.

In high-speed communication link designs, signal transmission at multigigabit speeds on a FR4 board is a particular challenging problem. With more non-homogeneous mediums (e.g., microstrip, connectors, vias) and longer transmission lines (T-lines) on boards, FEXT cancellation is moving to the forefront in board design considerations.

This problem has been addressed with topology changes in T-lines, receiver equalization, or coding algorithms. For example, J. Cioffi in U.S. Pat. No. 7,593,458, entitled, FEXT Determination System, describes how to determine FEXT. Hasegawa, Ginis, et. al., in U.S. Pat. No. 7,394,752, entitled, Joint Reduction of NEXT and FEXT in xDSL Systems, describe FEXT cancellation work based on the received signal. Jacobsen and Wiese in U.S. Pat. No. 6,205,220, entitled, Method to Mitigate The Near-Far FEXT Problem, describe a method and system for the shaping of T-lines. Chien and Tsao in A Novel Transmitter Side Based Far End Crosstalk Cancellation For A 10 GBASE-T also describe a method and system for FEXT cancellation through coding on the driver side. Gazizov in Far End Crosstalk Reduction in Double-Layered Dielectric Interconnects, describes reducing the FEXT with a coupled interconnect structure. Finally, Mallahzadeh, Ghasmemi, et al., in Crosstalk Reduction Using A Step Shaped Transmission Line proposed using a step-shaped T-line for FEXT reduction. All of the above-identified ways to address this issue are complex and add significant cost and are not readily adaptable to high volume production.

Accordingly what is desired is a method and system that addresses the above identified issues. The method and system should be cost effective, easy to implement and adaptable to existing processes. The present invention addresses such a need.

SUMMARY OF THE INVENTION

A communication system is disclosed. The communication system comprises a printed circuit board. The printed circuit board includes a plurality of channels. The communication system includes a plurality of receivers coupled to outputs of the plurality of channels, and a plurality of drivers coupled to inputs of the plurality of channels. A slew rate for each of the plurality drivers is dependent on transitions of its neighboring drivers. The communication system further includes a plurality of slew rate equalizers coupled to the plurality of drivers, where a slew rate driver coupled to a victim channel compensates for cross talk from its neighboring aggressor channels by adjusting its slew rate based upon a signal received from the slew rate equalizer of the victim channel.

A driver equalization methodology that cancels system far-end crosstalk (FEXT) noise based on slew rate variation is disclosed. A system and method in accordance with the present takes an electrical approach to combat FEXT and improve horizontal eye opening by 8% without changing any board topologies.

DETAILED DESCRIPTION

The present invention relates generally to a communication platform and more particularly to a method and system for minimizing cross-talk in such platforms. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
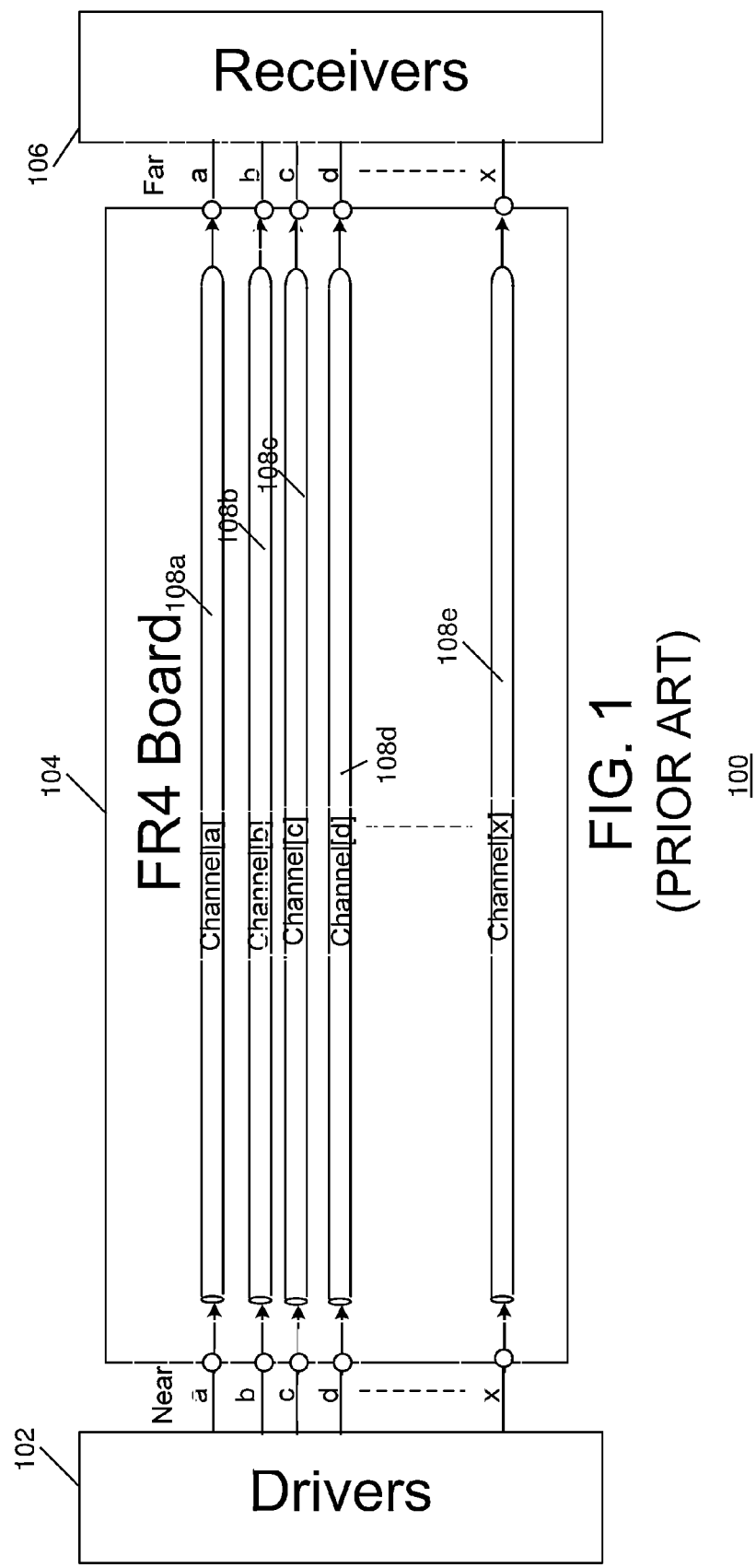
FIG. 1 illustrates a high-speed communication platform.

FIG. 1 illustrates a simple embodiment of a high-speed communication platform 100. The platform 100 includes a plurality of drivers 102 which are coupled to a plurality of receivers 106 via channels, such as T-lines 108a-108e on a printed circuit board 104. Signals are launched from the plurality of drivers 102 to the plurality of receivers 106 through T-lines or channels 108a-108e on the printed circuit board 104. In one embodiment the printed circuit board is low cost, such as an FR4 board. In addition, as is well known, although the channels 108a-108e are shown as a single layer there may be multiple layers of channels on the printed circuit board. The driver 102 outputs are at the near-end of T-lines 108a-108e and the receiver 106 inputs are at the far-end of the T-1 lines 108a-108e.

In modern high speed communications links, data are transmitted across parallel channels. The mutual capacitances and inductances induce fluctuations on adjacent channels. These fluctuations are referred to as crosstalk. In high-speed communication link designs, signal transmission at multigigabit speeds on a FR4 board cross talk is a particularly challenging problem. With more non-homogeneous mediums (such as microstrip, connectors, or vias) and longer transmission lines (T-lines) on boards, far end cross talk (FEXT) cancellation is at the forefront in both transceiver and board design considerations. To further describe this problem refer now to the following.

Figure 2:
FIG. 2 illustrates the definition of transition modes and how FEXT affects signal integrity.

FIG. 2 illustrates the definition of transition modes and how FEXT affects signal integrity. As is seen, when the transition mode T=0 there is no transition on the signal; when T=1 the signal transits from 0 to 1; and when T=−1 the signal transits from 1 to 0. A victim channel is in a superposition mode when the total of the transition modes (T) of its two neighboring channels is 0. The victim channel is in an even mode when the total of the transition modes is not 0 and when the signals on both the victim channel and its neighboring channels switch in the same direction. The victim channel is in an odd mode when the total of the transition modes is not 0 and when the signals on the victim and the neighboring channels switch in the opposite direction. In this embodiment only the case of T=1 on the victim channel is illustrated for purposes of explanation. T=−1 is similar to T=1, and T=0 is 'don't care.' In an odd mode, the victim channel couples both the positive forward traveling wave due to capacitive crosstalk and the negative forward traveling mode due to inductive crosstalk. In non-homogeneous mediums (such as microstrip, connectors, or vias), the two traveling waves do not typically cancel each other and end up showing as FEXT. As seen in the figure there are two representations of eye diagrams 150 and 152, respectively, to show the FEXT effects on signal integrity. The eye diagram 150 shows no FEXT while eye diagram 152 shows FEXT. As is seen, the width of the eye is significantly shorter with FEXT. Accordingly, when the inductive crosstalk dominates as is typical in T-line crosstalk applications, the slew rate of the signal at far end is boosted and it closes an eye diagram. Accordingly, it is desirable to minimize the effect of FEXT for signal integrity.

To address this problem, embodiments of the present invention use driver equalization to cancel FEXT in a high-speed communication link. According to embodiments of the invention, the equalization is slew rate-variation based and can be designated to compensate the positive/negative noise at a receiver input, i.e., the far-end of a T-line. The slew rate coefficient of each driver is transition-mode dependent to its neighboring drivers. A system and method in accordance with the present invention provides for FEXT cancellation and improves signal integrity through a circuit design approach while still allowing for the use of cheaper printed circuit boards, such as FR4 boards, as a source for reliable channels.

To describe the feature of the present invention in more detail refer now to following description in conjunction with the accompanying figures.

A system that utilizes the present invention can take the form of an implementation done entirely in hardware, entirely in software, or may be an implementation containing both hardware-based and software-based elements. In some embodiments, this disclosure may be implemented in software, which includes, but is not limited to, application software, firmware, resident software, program application code, microcode, etc.

Furthermore, the system and method of the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program or signals generated thereby for use by or in connection with the instruction execution system, apparatus, or device. Further a computer-readable medium includes the program instructions for performing the steps of the present invention. In one implementation, a computer-readable medium preferably carries a data processing or computer program product used in a processing apparatus which causes a computer to execute in accordance with the present invention. A software driver comprising instructions for execution of the present invention by one or more processing devices and stored on a computer-readable medium is also envisioned.

The medium can be an electronic, magnetic, optical, electromagnetic, infrared, or semiconductor system (or apparatus or device) or a propagation medium, or a signal tangibly embodied in a propagation medium at least temporarily stored in memory. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

A method and system in accordance with the present invention utilizes a plurality of slew rate equalizers coupled to the plurality of drivers to detect for crosstalk provided by neighboring aggressor channels to a victim channel and then adjusting the slew rate of the victim channel based upon the detected crosstalk. In so doing, FEXT is minimized and the signal integrity is significantly improved. A system and method in accordance with the present invention can be utilized in a variety of environments. For example it can be utilized in a variety of integrated circuits including but not limited to memory circuits, buffers and the like.

Figure 3:
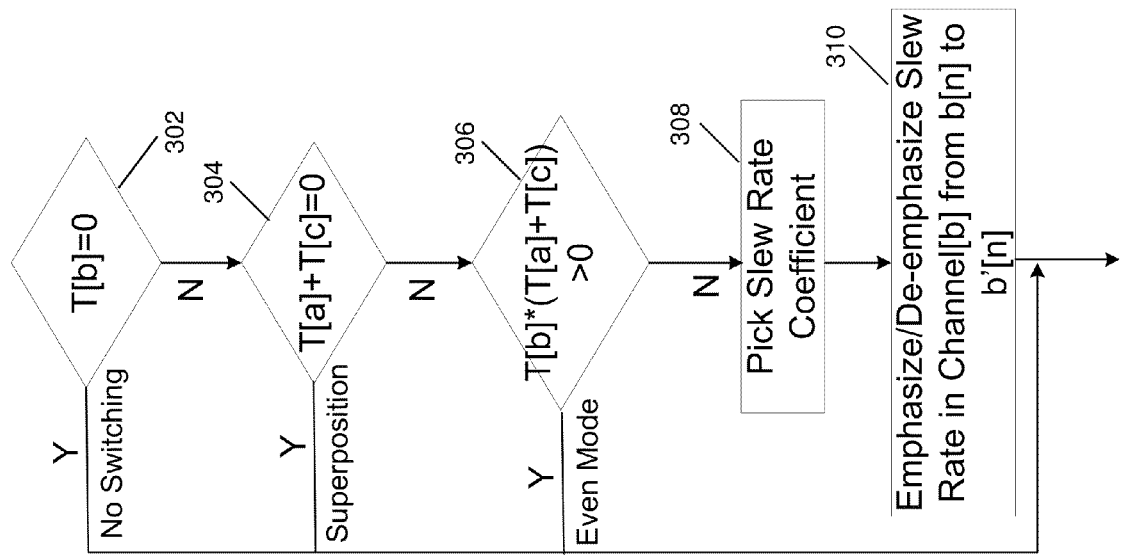
FIG. 3 illustrates a method for providing slew rate-variation based driver equalization in accordance with the present invention.

FIG. 3 illustrates a method of detecting slew rate-variation based driver equalization in accordance with the present invention. In this example, channel 108b is the victim channel and neighboring channels 108a and 108c are the aggressor channels. It should be understood that although channel 108b is identified as the victim channel, a system and method in accordance with the present invention operates effectively on any of the channels.

Referring back to FIG. 3, if there is no signal switching on the victim channel, via step 302, or there is superposition by the aggressor channels, via step 304 (e.g., the switching on each aggressor channel cancels each other out) or the switching is even, via step 306 (e.g., the aggressor channels are switching in the same direction) then no slew rate adjustment need be made. However if there is signal switching on the victim channel, via step 302, and there is superposition by the aggressor channels, via step 304, and/or the signal switching is odd, via step 306 (e.g., the aggressor channels are switching in the opposite directions), a slew rate coefficient is picked via step 308. Thereafter the slew rate is emphasized or deemphasized based upon the slew rate coefficient that is picked, via step 310.

In a system and method in accordance with the present invention, first the transition mode of a victim channel is determined, and then the total of the transition modes (T) of its neighboring channels is determined. Finally, the switching directions are determined and the final result is sent to the driver of the victim channel to pick a slew rate coefficient in the driver. Thereafter the slew rate of the driver is emphasized or deemphasized based upon the slew rate coefficient.

Figure 4:
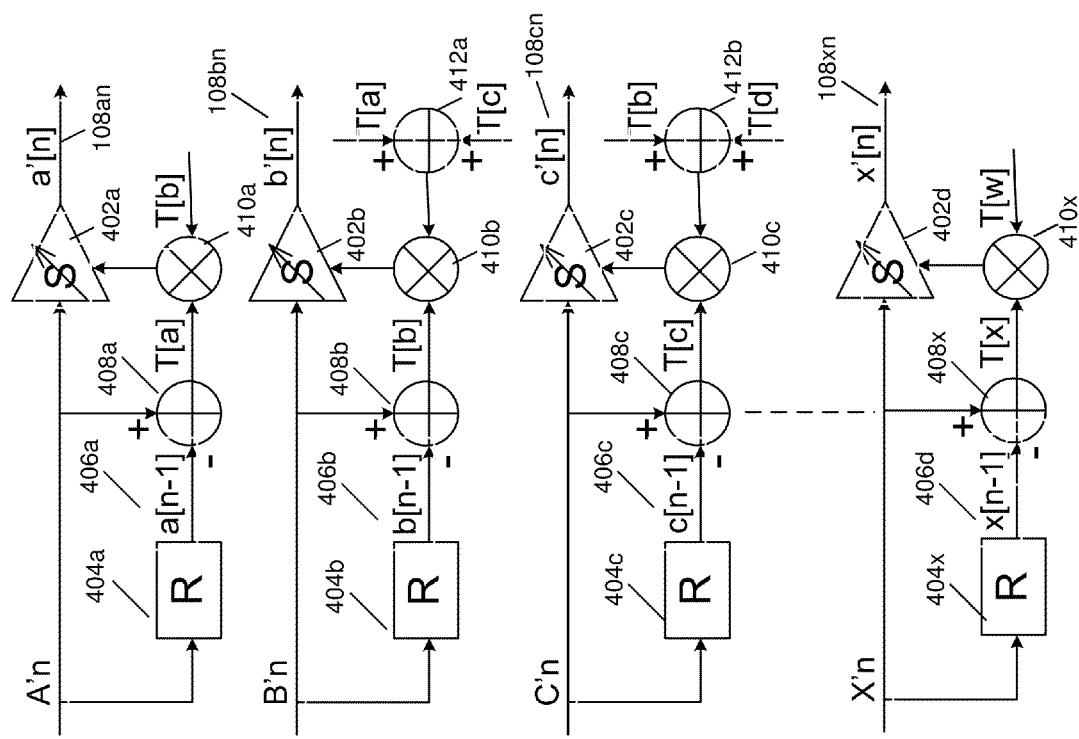
FIG. 4 illustrates an implementation of the method of FIG. 3.

FIG. 4 illustrates an implementation of the method of FIG. 3. Each of the channels includes a slew-rate driver 402a-402c that receives input signals A'n through C'n. Each of the channels further includes a register 404a-404c, a first adder 408a-408c, and a multiplier 410a-410c. As is also seen, channel 108b includes a second adder 412a. The second adder 412a receives cross talk transition signals from channel 108a and channel 108c. In this embodiment, channel 108b is the victim channel; channel 108a and channel 108c are the aggressor channels. Accordingly, when a signal is received on channel 108b, the signal is also provided to the register 404b which provides a delayed signal 406b. This delayed signal 406b is provided to a first adder 408b along with the input signal to determine if there is any transition between those two signals. The result of the adder 408a is sent to multiplier 410a. In addition, the transition signals of the neighboring channels, channels 108A and 108C, are sent to the second adder 412a.

The multiplier 410a multiplies the transitions from the first adder 408a and the second adder 412a. The output from the multiplier can be used to adjust the slew rate driver 402a by picking the appropriate slew rate coefficient and then emphasizing or deemphasizing the slew rate of the driver based upon the picked slew rate coefficient. In so doing, FEXT can be effectively minimized or reduced in a straightforward and effective manner.

The slew rate adjustment could be accomplished in a variety of ways. For example, this adjustment can be accomplished by adding capacitance to the input of the driver 402b. In another example, if the driver 402b is segmented into multiple stages, turning on or off a particular stage or particular stages will result in a change of the slew rate.

Figure 5:
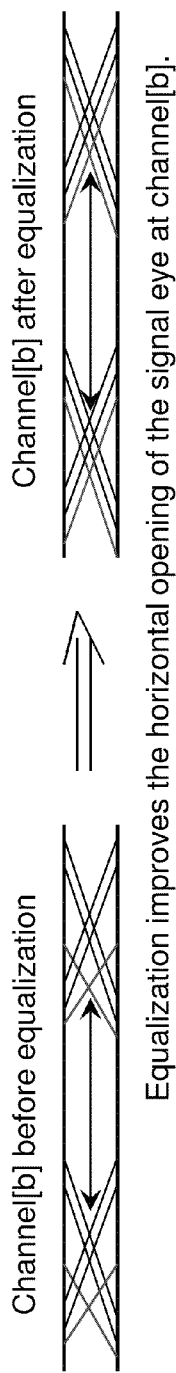
FIG. 5 illustrates the signal integrity improvement utilizing the slew rate-variation based driver equalization system and method in accordance with the present invention.
Figure 5:
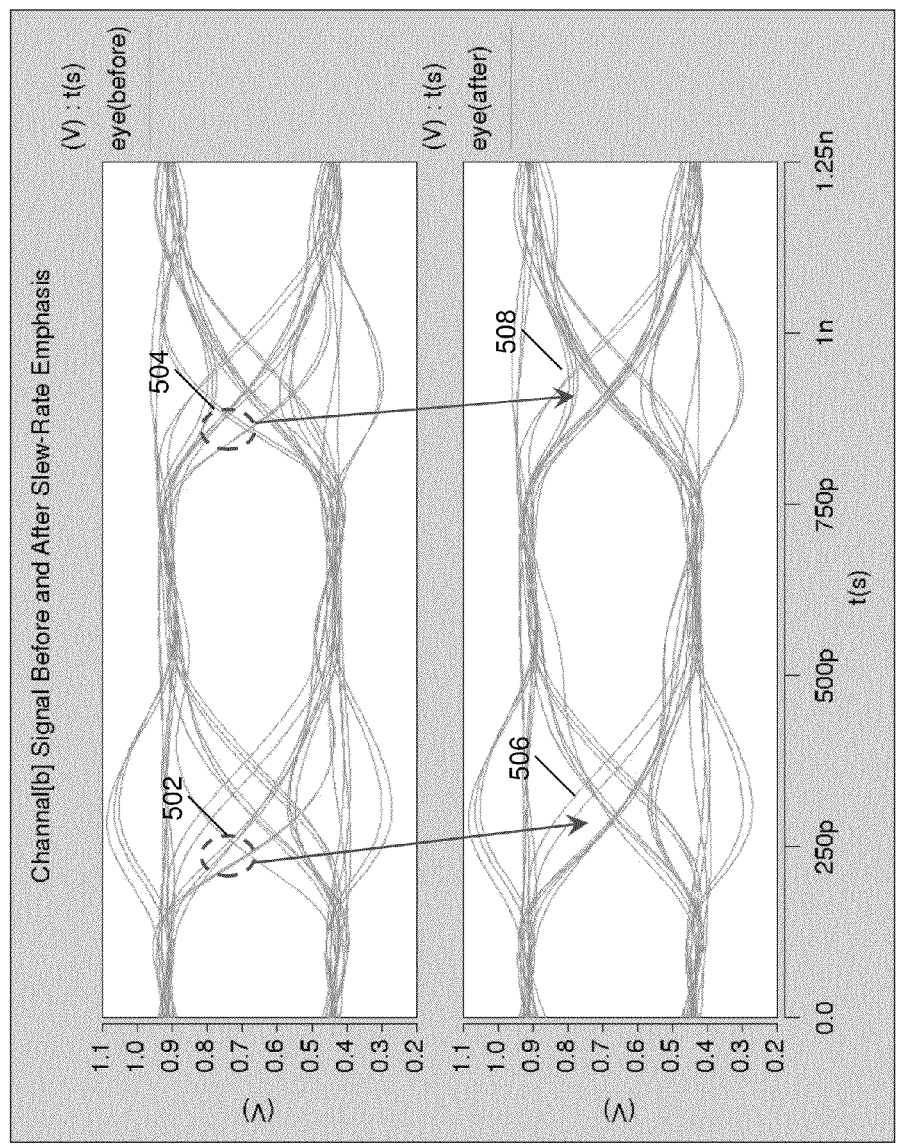

FIG. 5 illustrates the signal integrity improvement from the slew rate-variation based driver equalization signal with FEXT-boosted slew rate pushed back into the slope of the eye diagram. As is seen, the horizontal eye opening represented by 506 and 508 is thereby improved by 8% over the eye opening represented by 502 and 504 without changing any board topologies.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A communication system comprising:
a printed circuit board, the printed circuit board including a plurality of channels;
a plurality of receivers coupled to outputs of the plurality of channels;
a plurality of drivers coupled to inputs of the plurality of channels, wherein a slew rate for each of the plurality drivers is dependent on transitions of at least one neighboring driver; and
circuitry coupled to the plurality of drivers and within each of the plurality of channels, wherein a slew rate driver coupled to a victim channel compensates for cross talk from at least one neighboring aggressor channels by adjusting its slew rate based upon a signal received from the circuitry of the victim channel, wherein the circuitry of the victim channel comprises: a register for receiving the input signal and providing a delayed signal; a first adder for receiving the delayed signal and the input signal and providing a first transition signal; a second adder for receiving a transition signals from the at least two aggressor channels and providing a second transition signal; and a multiplier for receiving the first transition signal and the second transition signal, wherein if the product of the transition signal and the second transition signal is negative then the multiplier sends a signal to the slew rate driver coupled to the victim channel to pick a slew rate coefficient.

2. The communication system of claim 1, wherein the slew rate for each driver is programmable and can be adjusted based upon the signal sent from its multiplier.

3. The communication system of claim 1, wherein the at least one neighboring aggressor channel comprises two or more neighboring aggressor channels and the second adder receives at least two transition signals from the two or more neighboring aggressor channels which are added together to provide the second transition signal.

4. The communication system of claim 1, wherein the printed circuit board comprises a FR4 board.

5. The communication system of claim 2, wherein the driver coupled to the victim channel emphasizes or deemphasizes the slew rate in the victim channel based upon the picked slew rate coefficient.

6. The communication system of claim 2, wherein the slew rate of each driver is adjusted by adding capacitance to the input of each driver.

7. The communication system of claim 2, wherein each driver is segmented into stages, wherein turning one or off particular stages will adjust the slew rate.

8. A method for minimizing crosstalk between a victim channel and at least two aggressors channels in a communication system, the method comprising:
coupling a slew rate driver to the victim channel;
coupling a slew rate driver to each of the at least two aggressor channels;
coupling a circuit to the victim channel;
coupling a circuit to each of the at least two aggressor channels;
utilizing the circuit coupled to the victim channel to detect for crosstalk provided by the at least two aggressor channels to the victim channel and then adjusting the slew rate of the slew rate driver of the victim channel based upon the detected crosstalk, wherein the first circuit comprises: a register for receiving the input signal and providing a delayed signal; a first adder for receiving the delayed signal and the input signal and providing a first transition signal; a second adder for receiving a transition signals from the at least two aggressor channels and providing a second transition signal; and a multiplier for receiving the first transition signal and the second transition signal, wherein if the product of the transition signal and the second transition signal is negative then the multiplier sends a signal to the slew rate driver coupled to the victim channel to pick a slew rate coefficient.

9. The method of claim 8, wherein the slew rate for the driver coupled to the victim channel is programmable and can be adjusted based upon the signal sent from the multiplier.

10. The method of claim 8, wherein the slew rate of the victim channel is emphasized or deemphasized based upon the picked slew rate coefficient.

11. The method of claim 9, wherein the slew rate of each driver is adjusted by adding capacitance to the input of each driver.

12. The method of claim 9, wherein each driver is segmented into stages, wherein turning one or off particular stages will adjust the slew rate.

13. A communication system comprising:
an FR4 printed circuit board, the FR4 printed circuit board including a plurality of channels;
a plurality of receivers coupled to outputs of the plurality of channels;
a plurality of programmable slew rate drivers coupled to inputs of the plurality of channels, wherein a slew rate for each of the plurality slew rate drivers is dependent on transitions of its neighboring slew rate drivers; and
a plurality of circuits coupled to the plurality of drivers and the plurality of channels, wherein each of the plurality of circuits equalizers comprises a register for receiving the input signal and providing a delayed signal; a first adder for receiving the delayed signal and the input signal and providing a first transition signal; a second adder for receiving transition signals from at least two aggressor channels and providing a second transition signal; and a multiplier for receiving the first transition signal and the second transition signal, wherein if the product of the transition signal and the second transition signal is negative then the multiplier sends a signal to the driver of a victim channel to pick a slew rate coefficient; wherein the slew rate driver coupled to the victim channel compensates for cross talk from its neighboring aggressor channels by adjusting the slew rate based upon the picked slew rate coefficient.

14. The communication system of claim 13, wherein the slew rate of each driver is adjusted by adding capacitance to the input of each driver.

15. The communication system of claim 13, wherein each driver is segmented into stages, wherein turning one or off particular stages will adjust the slew rate.

16. A non-transitory computer readable medium containing program instructions for minimizing crosstalk between a victim channel and at least two aggressors channels in a communication system, the program instructions comprising:
coupling a slew rate driver to the victim channel;
coupling a slew rate driver to each of the at least two aggressor channels;
coupling a circuit to the victim channel;
coupling a circuit to each of the at least two aggressor channels;
utilizing the slew rate equalizers to detect for crosstalk provided by the at least two aggressor channels to the victim channel and then adjusting the slew rate of the slew rate driver of the victim channel based upon the detected crosstalk, wherein the circuit coupled to the victim channel comprises: a register for receiving the input signal and providing a delayed signal; a first adder for receiving the delayed signal and the input signal and providing a first transition signal; a second adder for receiving a transition signals from the at least two aggressor channels and providing a second transition signal; and a multiplier for receiving the first transition signal and the second transition signal, wherein if the product of the transition signal and the second transition signal is negative then the multiplier sends a signal to the slew rate driver coupled to the victim channel to pick a slew rate coefficient.

17. The non-transitory computer readable medium of claim 16, wherein the slew rate for the driver coupled to the victim channel is programmable and can be adjusted based upon the signal sent from the multiplier.

* * * * *